United States Patent
Guzik et al.

(10) Patent No.: US 7,140,696 B1
(45) Date of Patent: Nov. 28, 2006

(54) INTERNAL SPOKE NIPPLE WITH VARIABLE SPOKE ANGLES

(75) Inventors: David Guzik, Madison, WI (US); Steve Malchow, Lake Mills, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 142 days.

(21) Appl. No.: 10/877,393

(22) Filed: Jun. 25, 2004

(51) Int. Cl.
*B60B 1/04* (2006.01)

(52) U.S. Cl. .................... 301/58; 301/95.106
(58) Field of Classification Search ............. 301/55, 301/58, 95.104, 95.106, 104
See application file for complete search history.

(56) References Cited

U.S. PATENT DOCUMENTS

| | | | |
|---|---|---|---|
| 773,465 A | 10/1904 | Borg | |
| 804,617 A * | 11/1905 | Newton | 301/58 |
| 1,280,646 A * | 10/1918 | Billhartz | 301/58 |
| 5,228,756 A | 7/1993 | Krampera | |
| 5,673,976 A * | 10/1997 | Hillis et al. | 301/58 |
| 6,036,281 A * | 3/2000 | Campbell | 301/14 |
| 6,048,035 A * | 4/2000 | Chen | 301/30 |
| 6,126,243 A | 10/2000 | Okajima et al. | |
| 6,216,758 B1 * | 4/2001 | Chen | 152/379.4 |
| 6,234,580 B1 | 5/2001 | Muraoka et al. | |
| 6,283,557 B1 | 9/2001 | Okajima et al. | |
| 6,354,668 B1 | 3/2002 | Okajima et al. | |
| 6,382,734 B1 | 5/2002 | Passarotto | |
| 6,588,853 B1 | 7/2003 | Okajima | |
| 2003/0062762 A1 * | 4/2003 | Dietrich | 301/58 |

FOREIGN PATENT DOCUMENTS

| | | | |
|---|---|---|---|
| JP | 60-174302 | * | 9/1985 |
| JP | 61-81801 | * | 4/1986 |

* cited by examiner

*Primary Examiner*—Russell D. Stormer
(74) *Attorney, Agent, or Firm*—Barnes & Thornburg, LLP; David C. Brezina

(57) ABSTRACT

An internal spoke nipple for a bicycle rim that is positioned internal to the rim and can be pivoted for alignment with various spoke angles. The internal spoke nipple is adapted to be positioned within an aero or deep V-shaped rim. The spoke nipple includes a cupped shaped base portion and a stem portion. The cupped base portion allows the internal spoke nipple to automatically align with the angle of the attached spoke, eliminating undesirable lateral forces on the spoke. The internal spoke nipple further comprises a fully threaded central bore that is adapted to engage and retain the spoke. The stem portion includes a plurality flat side walls that are adapted to accept a spoke wrench, to allow for adjustment of spoke tension.

17 Claims, 2 Drawing Sheets

INTERNAL SPOKE NIPPLE WITH VARIABLE SPOKE ANGLES

BACKGROUND OF THE INVENTION

The present invention relates to spoke nipples and more specifically bicycle spoke nipples used to attach the spoke of the wheel to the rim of the bicycle. A bicycle wheel typically includes a hub, a plurality of spoke nipples, a plurality of spokes extending outwardly from the hub and an annular rim coupled to the outer ends of the spokes for supporting an inner tube and a tire. The annular rim includes a plurality of spoke attachment portions in the form of openings for retaining outer ends of spokes therein. The plulrality of spoke nipples are positioned within the openings and extend outwardly from the interior surface and are directed toward the hub. The outer ends of the spokes and are arranged to engage the spoke nipples. The hub includes a pair of hub flanges. Each hub flange includes a plurality of spoke attachment openings. The inner ends of the spokes are received in the spoke attachment openings. The inner ends of the spokes include a head portion adapted to be retained by the spoke attachment openings. Prior art spoke nipple arrangements can create undue stress on the spokes at the point where the spokes enter the nipples causing spoke failure, as well as undesirable wind drag for the rider.

These and other objects and advantages of the invention will be apparent from the following description, the accompanying drawings and the appended claims.

SUMMARY OF THE INVENTION

The present invention is directed to a internal spoke nipple for a bicycle rim that is positioned internal to the rim and can be pivoted for alignment with various spoke angles. The internal spoke nipple is adapted to be positioned within an aero or deep V-shaped rim. The spoke nipple includes a cupped shaped base portion and a stem portion. The cupped base portion allows the internal spoke nipple to automatically align with the angle of the attached spoke, eliminating undesirable lateral forces on the spoke. The internal spoke nipple further comprises a fully threaded central bore that is adapted to engage and retain the spoke. The stein portion includes a plurality flat side walls that are adapted to accept a spoke wrench, to allow for adjustment of spoke tension. Since the entire spoke nipple is threaded the nipple pulls the spoke shaft into the nipple so any spoke bend occurs in the shaft and not in the threads. Also the nipple and rim contact is flat with the outer radius of the nipple. The flat contact helps distribute load, which lowers stressing the contact patch area. The radius helps align the nipple with the spoke bracing angle. The design of the base portion of the spoke nipple prevents spoke bend since the nipple tilts to align with the spoke bracing angle.

BRIEF DESCRIPTION OF THE DRAWINGS

Other features and advantages of the disclosure will be set forth in part in the description which follows and the accompanying drawings, wherein an embodiment of the disclosure is described and shown, and in part will become apparent to those skilled in the art upon examination of the following description taken in conjunction with the accompanying drawings, or may be learned by practice of the disclosure. The advantages of the disclosure may be realized and attained by means of the instrumentalities and combinations particularly pointed out in the appended claims.

DETAILED DESCRIPTION OF THE INVENTION

Figure 1:
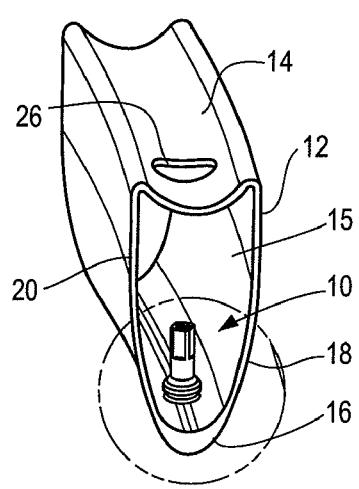
FIG. 1 is a perspective view of the internal spoke nipple positioned within a rim.
Figure 2:
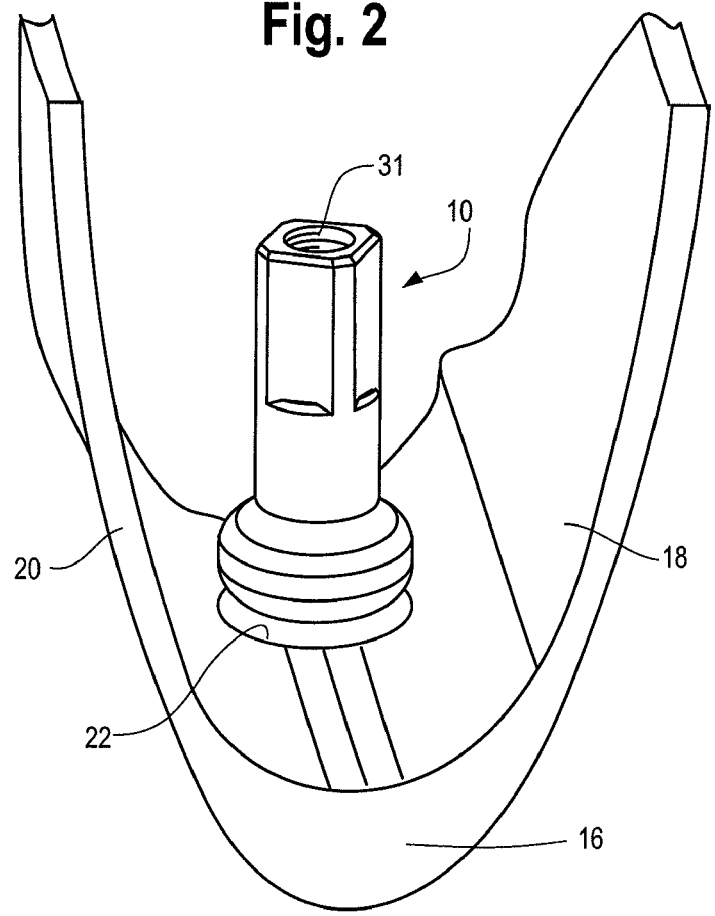
FIG. 2 is a detail view of the internal spoke nipple of FIG. 1.
Figure 3:
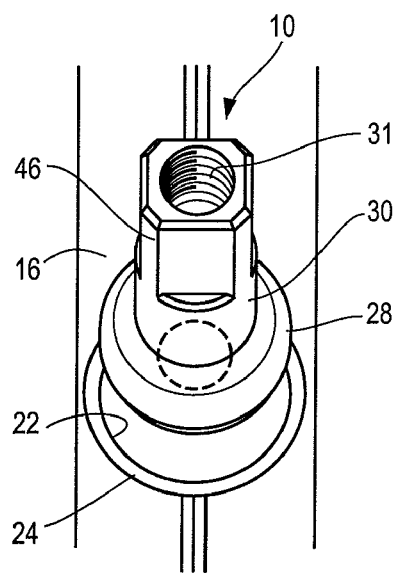
FIG. 3 is a perspective view of the internal spoke nipple.

The internal spoke nipple 10 is positioned within an aero or deep V-shaped rim 12 of a bicycle wherein top wall 14 of the rim 12 is spaced apart from a bottom wall 16 of the rim, closest to the hub, creating an internal cavity 15. The rim 12 can be in the form of a clincher or a sew-up style of rim, two of the most common rim configurations. The rim 12 is comprised of the bottom wall 16, the spaced apart top wall 14, a first tapered side wall 18 and a spaced apart second tapered side wall 20. The first and second side walls 18, 20 are symmetrical. The rims 12 can be fabricated from steel, aluminum, an alloy or a nonmetallic composite material such as carbon fiber. Aluminum rims 12 are extruded through a forming die and rolled into a multi-turn helix and cut into hoops.

The bottom wall 16 of the rim 12 includes a plurality of apertures 22 having a concave surface 24 along its perimeter adapted to accept the spoke nipple 10. The apertures 22 are spaced equidistant around the perimeter of the bottom wall 16. The top wall 14 of the rim 12 forms a support surface for the bicycle tire and includes a plurality of apertures 26 that allow access to the bottom wall 16 of the rim 12.

Figure 4:
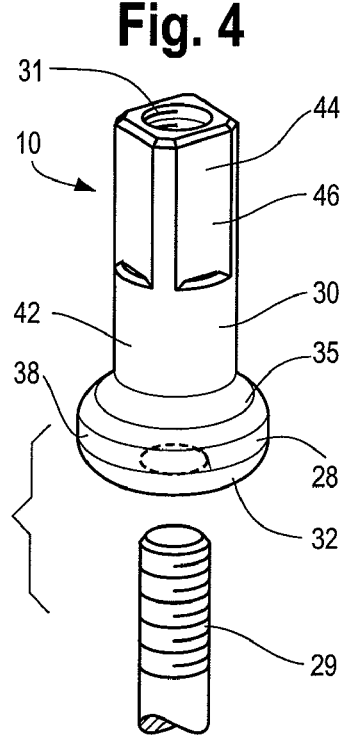
FIG. 4 is another perspective view of the internal spoke nipple.
Figure 5:
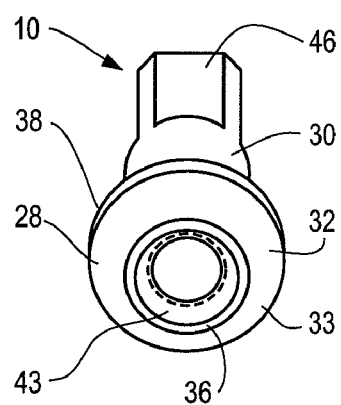
FIG. 5 is yet another perspective view of the internal spoke nipple.
Figure 6:
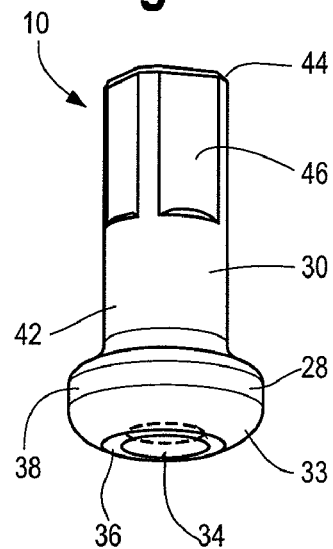
FIG. 6 is yet another perspective view of the internal spoke nipple.
Figure 7:
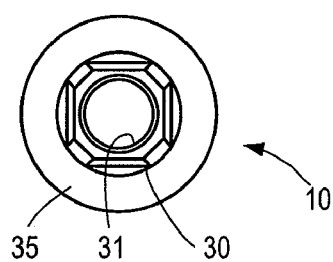
FIG. 7 is an end view of the internal spoke nipple, illustrating the shaft portion.
Figure 8:
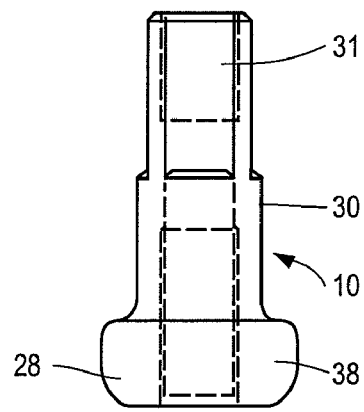
FIG. 8 is a cross-sectional view of the internal spoke nipple.
Figure 9:
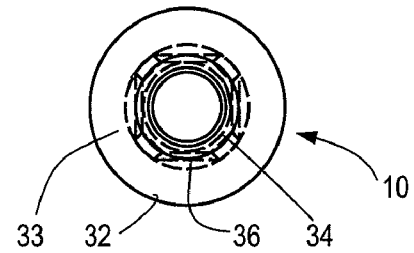
FIG. 9 is an end view of the internal spoke nipple, illustrating the seat portion.

The internal spoke nipple 10 is adapted to be positioned within the cavity 15 of the rim 12 and is comprised of a bulbous base portion 28, a stem portion 30 and a threaded bore 31. The base portion 28 includes a bottom surface 32 and a spaced apart top surface 35. The bottom surface 32 of the base portion 28 is bowl or cupped shaped as shown in FIGS. 4–6. While the base portion 28 is shown in a cup or bowl shape, other configurations that would allow for the spoke nipple 10 to pivot for alignment with the spokes 29 of the bicycle wheel may also be used. The bottom surface 32 is comprised of an outer face 33, an inner face 34 and a transition face 36.

The outer face of the bottom surface 32 is convexly curved and slopes into a side wall 38 of the base portion 28. The outer face 33 of the base portion 28 is adapted to seat within a concave support wall 40 of the apertures 22. The shape of the outer face 33 allows the spoke nipple 10 to pivot within the aperture 22, permitting proper alignment with the spokes. The side wall 38 forms the perimeter of the base portion 28. The transition face 36 forms the transition surface between the inner face 34 and the outer face 33. The inner face 34 slopes inwardly from the transition face 36 and slopes toward the threaded bore 31. The inner face 34 aids in the alignment of the spoke with the threaded bore 31.

The stem portion 30 of the spoke nipple 10 includes a first end 42 and a spaced apart second end 44, as shown in FIG. 6. The first end 42 is attached to the base portion 28 and is cylindrical in shape. The second end 44 of the stem portion 30 forms the uppermost end of the spoke nipple 10 and is the exit point for the threaded bore 31. The second end 44 includes a plurality of faces 46 that allow for engagement with a spoke adjustment socket (not shown), which allow the spoke nipple 10 to be rotated. The rotation of the spoke nipple 10 allows the spokes to be tightened or loosened.

The threaded bore 31 of the spoke nipple 10 passes through the center of the nipple 10 and is adapted to engage the threaded end of the spokes. The use of a completely threaded bore 31 increases the ability of the spoke nipple 10 to apply tension to the spoke over a greater surface area lessening the likelihood of spoke failure.

In use, the spokes are laced through the apertures in the hub flanges and inserted through the apertures 22 of the bottom wall 16 of the rim 12. The internal spoke nipples 10 are inserted, base portion 28 first, through the apertures 26 of the top wall 14 of the rim 12. Due to the diameter of the aperture 26, a tool is connected to the stem portion 30, so that the spoke nipple 10 can be properly inserted into the rim 12. The threaded bore 31 is aligned with the threaded end of the spoke and rotated to engage the threads of the spoke. The spoke nipple 10 will automatically pivot to correspond to the angle of the spoke entering the 10 aperture 22. The spoke nipple 10 is rotated, drawing the spoke within the threaded bore 31, until the desired spoke tension is achieved. Since the entire spoke nipple 10 is threaded the nipple 10 pulls the spoke shaft 29 into the nipple so any spoke bend occurs in the shaft and not in the threads of the spoke 29. Also the nipple 10 and rim 12 contact is flat with the outer radius of the nipple. The flat contact helps distribute load, which lowers stressing the contact patch area. The radius helps align the nipple 10 with the spoke bracing angle. The design of the base portion of the spoke nipple prevents spoke bend since the nipple 10 tilts to align with the spoke bracing angle.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A rim with internal spoke nipples comprising:
   a bottom wall and a pair of side walls connected with said bottom wall, said bottom wall including a plurality of spaced apart openings;
   a top wall spaced apart from said bottom wall and connected to said side walls, said bottom, top and side walls defining a cavity;
   a plurality of internal spoke nipples having a bulbous base portion with first and second sides and a narrowed stem portion coupled to said first side of said base portion, said base and stem portions of said internal spoke nipples being disposed completely within said cavity of said rim, each of said plurality of internal spoke nipples having a central bore adapted to threadably engage and retain a spoke said central bore having an tapered opening adjacent said second side of said base portion;
   wherein said base portion of each of said plurality of internal spoke nipples is aligned with one of said openings in said bottom wall of said rim and said second side of said base portion is in contact with said bottom wall of said rim.

2. The rim with internal spoke nipples of claim 1, wherein said top wall forms the top of said rim, said top wall including a plurality of openings to permit access to said stem portion of said internal spoke nipples.

3. The rim with internal spoke nipples of claim 1, wherein said stem portion of said internal spoke nipples include at least one face adapted to accept a spoke tightening tool.

4. The rim with internal spoke nipples of claim 1, wherein said openings in said bottom wall including seats surrounding each of said openings, said seats adapted to accept said base portion of said internal spoke nipples.

5. The rim with internal spoke nipples of claim 4, wherein said base portion of said internal spoke nipples includes an outer face that is convexly shaped, said outer face adapted to pivotally engage said seats of said openings.

6. A bicycle wheel rim for a bicycle comprising:
   a bottom wall including a plurality of spaced apart openings therein;
   a pair of side walls coupled to said bottom wall;
   a top secondary wall spaced apart from said bottom wall, said to wall including a plurality of spaced apart openings therein;
   a pair of side walls interconnecting said top, bottom and side walls defining a cavity within said bicycle wheel rim;
   a plurality of spoke nipples disposed completely within said cavity defined by said walls, said plurality of spoke nipples having a bulbous base portion, with first and second sides, said first side of said base portion pivotally engaging said openings;
   said spoke nipples including a narrowed stem portion connected to a second side of said base portion and including a central bore passing through at least a portion of said spoke nipples, said central bore having a tapered opening positioned adjacent said first side of said base portion.

7. The bicycle wheel rim of claim 6, wherein said central bore of said plurality of spoke nipples is threaded to engage spokes.

8. The bicycle wheel rim of claim 6, wherein said top wall forms the top surface of said rim.

9. The bicycle wheel rim of claim 6, wherein said stem portion of said spoke nipples include at least one face adapted to accept a spoke tightening tool.

10. The bicycle wheel rim of claim 6, wherein said openings in said bottom wall include seats surrounding each of said openings, said seats adapted to accept said base portion of said spoke nipples.

11. The bicycle wheel rim of claim 10, wherein said base portion of said spoke nipples includes an outer face that is convexly shaped, said outer face adapted to pivotally engage said seats of said openings.

12. A bicycle wheel rim with internal spoke nipples comprising:
   a bottom wall forming a portion of said rim having a top surface and a bottom surface, said bottom wall including a plurality of spaced apart openings;
   a first side wall connected to said bottom wall;
   a second side wall connected to said bottom wall and spaced apart from said first side wall;
   a top wall connected to said first and second side walls, said top, bottom and side walls defining a cavity;
   a plurality of spokes extending outwardly from said bottom surface of said first wall, a portion of said spokes adapted to pass through said plurality of openings of said first wall;

a plurality of internal spoke nipples disposed completely within said cavity and extending outwardly from said top surface of said first wall, each of said spoke nipples positioned over a respective spaced apart openings;

said internal spoke nipples having a bulbous base portion and a narrowed stem portion connected to said base portion, said base portion adapted to pivotally engage said top surface of said first wall and include a central bore, said central bore of said internal spoke nipples having a tapered opening and adapted to accept at least a portion of said spokes therein;

wherein rotation of said internal spoke nipples in a first direction increases tension on said spokes and rotation of said internal spoke nipples in a second direction decreases tension on said spokes.

13. The bicycle wheel rim with internal spoke nipples of claim 12, wherein said central bore of said plurality of internal spoke nipples is threaded to engage said spokes.

14. The bicycle wheel rim with internal spoke nipples of claim 12, wherein said a second wall includes a plurality of openings to permit access to said internal spoke nipples.

15. The bicycle wheel rim with internal spoke nipples of claim 12, wherein said stem portion of said internal spoke nipples include at least one face adapted to accept a spoke tightening tool.

16. The bicycle wheel rim with internal spoke nipples of claim 12, wherein said openings in said first wall including seats surrounding each of said openings, said seats adapted to accept said base portion of said internal spoke nipples.

17. The bicycle wheel rim with internal spoke nipples of claim 16, wherein said base portion of said internal spoke nipples include an outer face that is convexly shaped, said outer face adapted to pivotally engage said seats of said openings.

\* \* \* \* \*